Jan. 17, 1956  B. H. SMITH  2,731,590
POLYPHASE VOLTAGE GENERATOR
Filed July 21, 1954
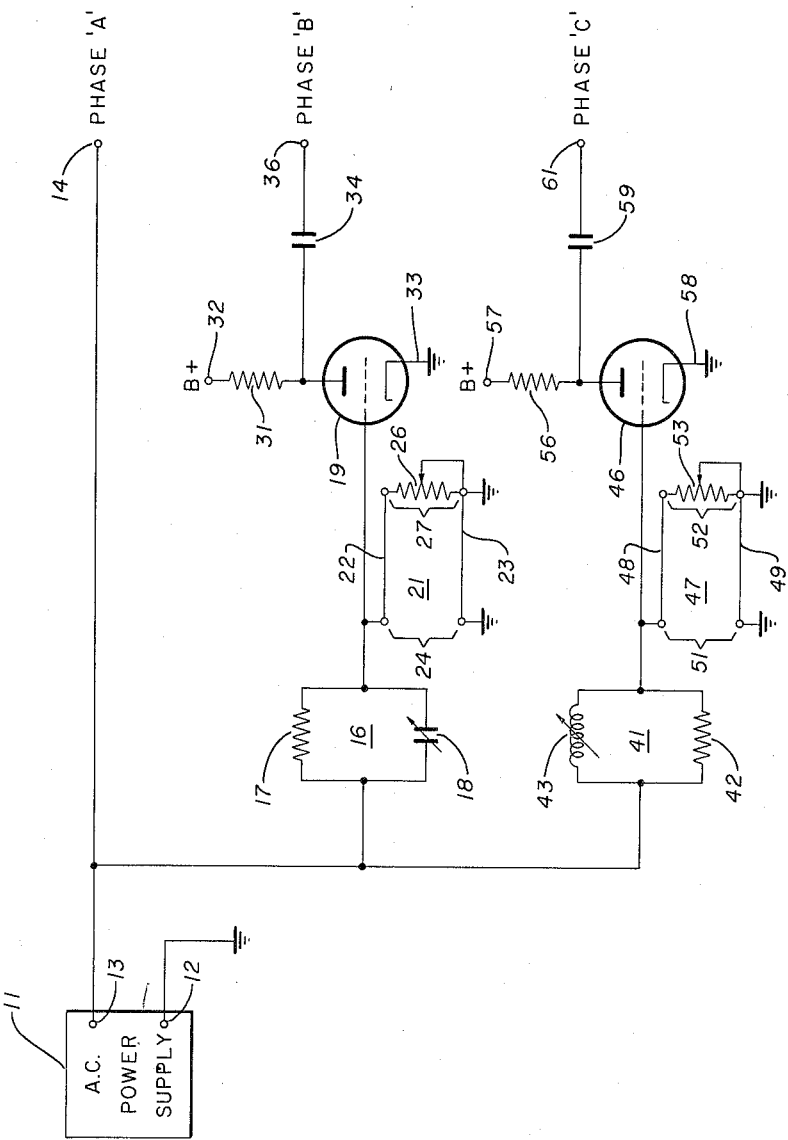
INVENTOR.
BOB HUGH SMITH
BY
Roland A. Anderson
ATTORNEY.

United States Patent Office 2,731,590
Patented Jan. 17, 1956

2,731,590

POLYPHASE VOLTAGE GENERATOR

Bob Hugh Smith, Berkeley, Calif., assignor to the United States of America as represented by the United States Atomic Energy Commission Application July 21, 1954, Serial No. 444,929

3 Claims. (Cl. 321—36)

The present invention relates to a polyphase voltage generator and more particularly to an electronic polyphase voltage generator having means for altering the angle between phases without varying the magnitude of the output voltages.

With the increasing use of radio-frequency voltages, having a frequency in the megacycle range, polyphase system are not unusual. Most such voltages are developed electronically to have a fixed phase relationship and any attempt at altering the phase results in variation in the magnitudes of the voltages between phases. Also, known polyphase voltage generators employ resistor networks in the output circuit which consume considerable power.

The present invention overcomes the foregoing difficulties and disadvantages with a simple circuit utilizing commercially available component elements. In general, the invention is illustrated as a three-phase generator and comprises a single phase radio-frequency power supply, the output of which is utilized as the "A" phase of the polyphase system, and a pair of vacuum tubes having 45 degree sections of transmission line respectively connected between control grid and cathode and being respectively driven by 60 degree lagging, and 60 degree leading networks which are utilized as the "B" and "C" phases. Each of the 45 degree sections of transmission line is terminated in a potentiometer having a range of resistance value which includes a value equal to the characteristic impedance of the line. A property of such 45 degree sections of transmission line is that the magnitude of the input impedance remains constant for all values of terminating impedance while the phase angle does not.

It is therefore an object of the invention to provide a new and improved polyphase voltage generator.

Another object of the invention is to provide a polyphase voltage generator including means for altering the phase angles without varying the magnitudes of the voltages.

A further object of the invention is to provide a polyphase voltage generator having a low power consumption.

Still another object of the invention is to provide a polyphase voltage generator including sections of 45 degree transmission line having variable terminating impedances for altering phase angles without variation in magnitude of voltage.

Further objects and advantages of the invention will be apparent in the following description and claims considered together with the accompanying drawing which is a schematic wiring diagram.

Referring to the drawing in detail, there is provided a conventional single-phase alternating current power supply 11 having a high frequency voltage output between two terminals 12 and 13. One terminal 12 is grounded and the other terminal 13 is directly connected to an output terminal 14. Such output terminal 14 serves as a phase "A" connection and the votlage to ground is utilized for reference purposes in the following description.

The terminal 13 of the power supply 11 is also connected to one end of a parallel circuit 16 comprising a parallel-connected resistor 17 and variable capacitor 18 having values such that a current flow therethrough will lead the impressed voltage by 60 degrees. The other end of the parallel circuit 16 is connected to the control grid of an amplifier type vacuum tube 19. A section of transmission line 21 having two conductors 22, 23 is provided with one conductor 22 connected at the input end 24 to the control grid of the tube 19 and the other conductor 23 connected to ground. So that the magnitude of the input impedance of the transmission line 21 remains at a constant value, the effective electrical length of such line is selected to be 45 degrees (one-eighth wave length) at the frequency of the output voltage of the power supply 11. In accordance with the objects of the invention, it is necessary that the phase angle, between the current and voltage at the input end 24 of the transmission line 21, be adjustable and to accomplish such adjustment a potentiometer 26 is connected between the conductors 22, 23 of the line at the terminal end 27. The junction between the potentiometer 26 and the grounded conductor 23 is grounded and the variable arm of the potentiometer is also connected to ground. While the transmission line 21 has been illustrated and described as a two-wire line, it will be readily apparent that coaxial cable or lumped constants in the form of an artificial line are equally operable to provide the desired function at the control grid of the tube 19.

Operating connections for the tube 19 comprise a dropping resistor 31 connected from the anode of the tube to a source 32 of direct current (B+) and a lead 33 directly connected to ground. Voltage variations at the anode of the tube 19 are coupled by a blocking capacitor 34 to a second output terminal 36 which serves as a phase "B" connection. The voltage with respect to ground which appears at the second output terminal 36 is then leading the phase "A" voltage at the output terminal 14 by 240 degrees because of the 60 degree lead provided by the parallel circuit 16 and the 180 degree phase shift provided by the tube 19.

Similarly, the terminal 13 of the power supply 11 is connected to one end of a parallel circuit 41 comprising a parallel-connected resistor 42 and variable inductor 43 having values such that a current flow therethrough will lag the impressed voltage by 60 degrees. The other end of such parallel circuit 41 is connected to the control grid of a second amplifier type vacuum tube 46. A second section of transmission line 47 having two conductors 48, 49 is provided with one conductor 48 connected at the input end 51 to the control grid of the second tube 46 and the other conductor 49 connected to ground. The effective electrical length of such line 47 is selected to be 45 degrees at the frequency of the output of the power supply 11 for the reason set forth with respect to the first line 21. Also, the second line 47 is terminated at the terminal end 52 in a variable resistance provided by a potentiometer 53 connected between the conductors 48, 49 with one side grounded at the grounded conductor 49 and the variable element connected to such ground connection.

A dropping resistor 56 is connected between the anode of the tube 46 and a source 57 of direct current (B+) which may be the same as the source 32 for the first tube 19. To complete the operating connections for the second tube 46 the cathode is directly connected to ground by a lead 58. Variations in voltage at the anode of the tube 46 are coupled by a blocking capacitor 59 to a third output terminal 61 which serves as a phase "C" connection. The voltage with respect to ground which appears at the third output terminal 61 is then leading the phase "A" voltage at the first output terminal 14 by 120 degrees because of the 60 degree lag provided by the parallel circuit 41 and the 180 degree phase shift provided by the second tube 46.

From the foregoing, it is readily apparent that from the single phase voltage of the power supply 11 there has been developed a three-phase voltage source. The voltage from the second output terminal 36 to ground (phase "B") lags the voltage from the first terminal 14 to ground (phase "A") by 120 degrees and the voltage from the third terminal 61 to ground (phase "C") leads the voltage from the first terminal 14 to ground by 120 degrees.

Consider now the operation of the above-described circuit with the alternating current power supply 11 suitably energized to develop a high frequency voltage between the terminals 12 and 13. Since there is a direct connection between the power supply 11 and the first output terminal 14, the voltage from such terminal to ground is the same as the output voltage of the power supply.

It will be noted that the parallel circuit 16 and the line 21 are connected in series across the output voltage of the power supply 11. As stated previously, the input impedance of a transmission line, which is 45 electrical degrees in length, has a constant magnitude for all values of terminating impedance while the phase angle varies. Such property may be readily determined from the well-known equation for input impedance ($Z_{IN}$), which is:

$$Z_{IN} = Z_0 \left[ \frac{Z_L \cos \beta 1 + j Z_0 \sin \beta 1}{Z_0 \cos \beta 1 + j Z_L \sin \beta 1} \right]$$

where $Z_0$ is the characteristic impedance of the transmission line, $Z_L$ is the terminating impedance of the line, and $\beta 1$ is the electrical length of the line. Thus for a transmission line having an electrical length ($\beta 1$) of 45 degrees the formula for input impedance becomes:

$$Z_{IN} = Z_0 \left[ \frac{Z_L + j Z_0}{Z_0 + j Z_L} \right]$$

Considering the latter formula more fully, it will be seen that, where the terminating impedance equals the characteristic impedance, the input impedance is resistive and equals the characteristic impedance. Also, where the terminating impedance is greater than the characteristic impedance, the input impedance is equal to the characteristc impedance but there is a capacitive reactance component present. Further, where the terminating impedance is less than the characteristic impedance, the input impedance is equal to the characteristic impedance, but there is an inductive reactance component.

Again considering the parallel circuit 16 and 45 degree section of transmission line 21, the variable capacitor 18 is established at a value such that the current through the circuit leads the impressed voltage by 60 degrees. Such adjustment is preferably made when the value of resistance of the potentometer 26 is set at the characteristic impedance of the line 21. The voltage across the input end 24 of the line 21 is impressed between the control grid and cathode of the first tube 19 and therefore drives the tube with a voltage which necessarily leads the voltage output of the power supply 11 by 60 degrees. The voltage at the anode of the tube 19 is 180 degrees out of phase with the grid voltage and thus the voltage to ground as coupled to the second output terminal 36 lags the voltage of the power supply by 120 degrees.

A similar analysis of the parallel circuit 41 and transmission line 47 results in a determination that the voltage impressed between the control grid and cathode of the second tube 46 lags the output voltage of the power supply 11 by 60 degrees. Also the second tube 46 introduces another 180 degree phase shift so that the voltage to ground at the third output terminal 61 leads the output voltage of the power supply 11 by 120 degrees. Thus the terminals 14, 36, 61 may be connected to a three-phase voltage system, either Y- or delta-connected, as the supply therefor.

After the original adjustment of the variable capacitor 18 and variable inductor 43, any change in the phase relationship of the voltages between the output terminals 14, 36, 61 may be counteracted by appropriate adjustments of the potentiometers 26, 53 at the respective terminal ends 27, 52 of the transmission lines 21, 47. Such counteracting adjustments may be made either manually or automatically. Such automatic adjustment may be readily accomplished by adapting a phase meter, such as disclosed by Leavitt et al. in U. S. Patent 2,676,299, issued April 20, 1954, to operate selsyn controls attached to the potentiometers 26, 53.

Thus, there has been described in detail a three-phase voltage generator or source. The phase angles between the voltages are adjustable and it is inherent in the circuitry that the magnitudes of the phase voltages remain constant for desired adjustments. The circuit arrangement is such that power drain by the circuit in developing the three-phase voltages is a minimum, since there are no resistive elements directly connected between the phases. The principles and elements set forth to provide the described three-phase generator are equally adaptable for other polyphase sources in that a suitable parallel phase-shifting network, 45 degree transmission line, and amplifier tube are all that are required for each desired phase.

While the salient features of the present invention have been described in detail with respect to one embodiment, it will be apparent that numerous modifications may be made within the spirit and scope of the invention, and it is therefore not desired to limit the invention to the exact details shown except insofar as defined in the following claims.

What is claimed is:

1. In a phase generator, the combination comprising a source of alternating voltage having a pair of output terminals, a vacuum tube having at least an anode, control grid and cathode, means connected between anode and cathode of said tube for impressing an operating potential, a phase shift network connected between one of said output terminals and the control grid of said tube, a section of transmission line having an input end and a terminal end with the input end connected between the control grid and cathode of said tube, and a variable resistance connected across the terminal end of said line, said line having an electrical length equal to one-eighth of the wave length at the frequency of said source whereby the voltage at the anode of said tube has a predetermined phase relationship with respect to the voltage between said output terminals which may be varied by said resistance while the value of voltage remains constant.

2. In a phase generator, the combination comprising a source of alternating voltage having a pair of output terminals, a sixty degree leading phase-shift network connected to one of said output terminals, a first section of transmission line having an input end connected between said leading network and the other of said output terminals, a variable resistance connected across a terminal end of said first line, phase inversion means connected across said input of said first line and having an output, a sixty degree lagging phase-shift network connected to said one of said output terminals, a second section of transmission line having an input end connected between said lagging network and said other of said output terminals, a variable resistance connected across a terminal end of said second line, and phase inversion means connected across said input of said second line and having an output, said first and second lines having an electrical length equal to one-eighth of the wave length at the frequency of said source.

3. In a phase generator, the combination comprising a source of alternating voltage having a pair of output terminals, a first and second vacuum tube having at least an anode, control grid and cathode, means connected between anode and cathode of each tube for impressing operating potential, a sixty degree leading phase-shift network connected between one of said output terminals and the control grid of said first tube, a sixty degree lagging phase-shift network connected between said one of said output terminals and the control grid of said second tube, a first and second section of transmission line respectively having a variable resistance connected across one end and being one-eighth of the wave length in electrical length at the frequency of said source, said first and second line being respectively connected between control grid and cathode of said first and second tube, whereby voltages are developed at the anode of said first and second tube which respectively lag and lead the voltage of said source.

References Cited in the file of this patent

UNITED STATES PATENTS

| | | |
|---|---|---|
| 1,719,356 | Benioff | July 2, 1929 |
| 2,524,759 | Brown | Oct. 10, 1950 |